June 5, 1956          A. M. ROTMAN          2,748,689
COFFEE URN

Filed Aug. 18, 1952                              3 Sheets-Sheet 1

INVENTOR.
Allen M. Rotman
BY Cook & Robinson
ATTORNEYS

June 5, 1956  A. M. ROTMAN  2,748,689
COFFEE URN
Filed Aug. 18, 1952  3 Sheets-Sheet 2

INVENTOR.
Allen M. Rotman

June 5, 1956  A. M. ROTMAN  2,748,689
COFFEE URN

Filed Aug. 18, 1952  3 Sheets-Sheet 3

INVENTOR.
Allen M. Rotman
BY
Cook & Rotman
ATTORNEYS

United States Patent Office 2,748,689
Patented June 5, 1956

2,748,689

COFFEE URN

Allen M. Rotman, Seattle, Wash., assignor, by direct and mesne assignments, to Mello-Cup Coffee Company Inc., Seattle, Wash.

Application August 18, 1952, Serial No. 304,984

1 Claim. (Cl. 99—315)

This invention relates to coffee urns and more particularly to improvements in coffee urns wherein water is heated to boiling temperature in a relatively large jacket and is drawn from the jacket and caused to flow through the ground coffee into the coffee jar or crock; the present invention residing in the use of a novel, controlled mechanical means for pumping the boiling water from the jacket to a position above the ground coffee to flow therethrough into the coffee crock.

Generally speaking, commercial coffee urns, such as are used in restaurants, are old. In these urns numerous means have been provided for heating the water in the jacket of the urn and the hot water is drawn from the jacket and poured over the coffee grounds disposed in the upper portion of the coffee crock. To my knowledge, no simple and inexpensive mechanical means has been completely satisfactory for this purpose as it is still the common practice to draw the hot water from the jacket into a large pitcher or container and to pour it by hand from the container into the crock. Obviously, it is dangerous for persons to be handling boiling hot water in this manual operation. Furthermore, it is time consuming and there is no exacting assurance that the amount of water used in making each batch of coffee will be substantially the same so as to obtain a uniform coffee brew.

It is known that numerous attempts have been made to pump boiling water from the jacket into the crock but to date, none of these attempts have been successful when the water has been heated to boiling temperature. The problem which has confronted persons making previous attempts arises by reason of the necessity of pumping boiling water under relatively low pressure in uniform and accurate amount to assure the quality of the coffee in each coffee making operation. In the past, the quantities of water pumped during a given period have not been uniform and therefore coffee urns which employ pumps have not been successful or acceptable to the trade when attempting to use boiling water.

It is therefore, the principal object of my invention to provide means in a coffee urn whereby it is possible to repeatedly pump boiling water in exactly the same amount from the jacket into the coffee crock in a specific time interval.

Another object of my invention is to provide a means for pumping boiling water from the jacket of the urn into the crock which may be readily incorporated into coffee making devices presently in use and thereby readily converting them from manual to automatic units.

A further object of my invention is to provide a means for mechanically pumping the boiling water from the jacket of the urn to the crock which is relatively simple in its construction and which is relatively low in cost.

Other objects of my invention reside in the details of construction and in the combination of parts which will hereinafter be more fully described.

In accomplishing these and other objects of my invention, I have provided the improved details of construction, the preferred forms of which are illustrated in the accompanying drawings, wherein—

It is well known that pumps have been used to pump water and there are pumps designed to pump boiling water and other liquids which have been heated to a high temperature. However, my invention resides in employing a pump of a specific type, which of necessity is relatively small and which will pump a specific amount of boiling water in a specific time interval. Furthermore, the invention resides in the specific manner and position in which the pump is mounted in the coffee urn and in the relative size of the passage or opening between the pump and the water jacket.

Referring more in detail to the drawings—

Figure 1:
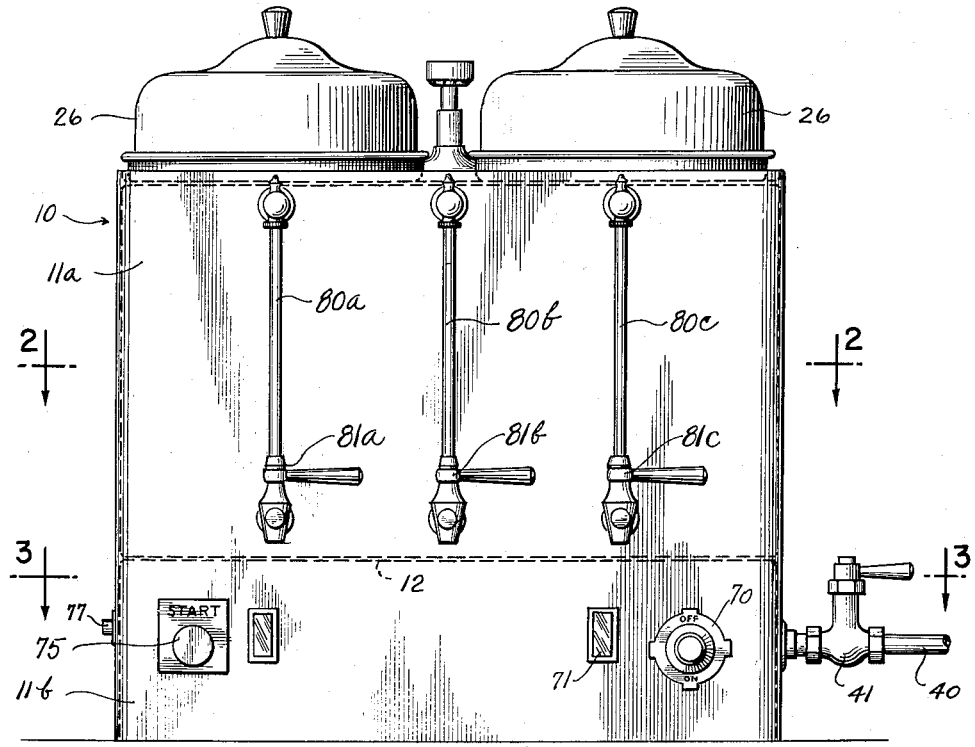
Fig. 1 is a front elevation of a commercial coffee making urn with which the present invention is embodied.
Figure 4:
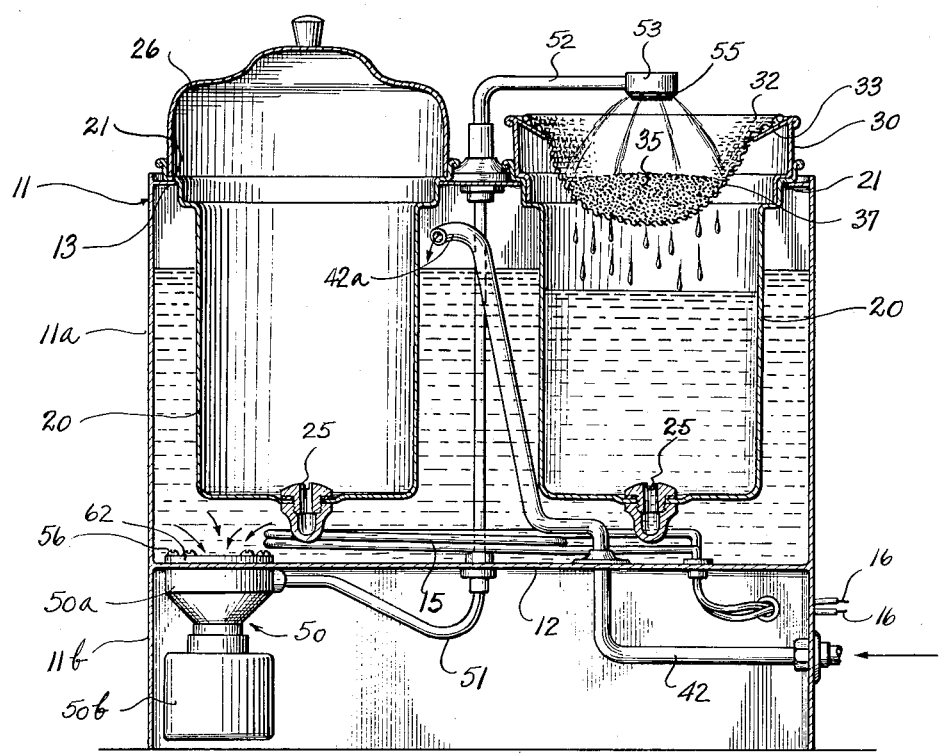
Fig. 4 is a vertical cross-section taken on line 4—4 in Fig. 2.

In Fig. 1, I have illustrated a conventional, commercial coffee making device of the type presently used in restaurants or commercial establishments and have designated in its entirety by reference numeral 10. The component parts of the urn are best illustrated in Fig. 4 wherein it is shown to comprise a sheet metal housing 11, preferably made from stainless steel for purposes of sanitation and appearance. This housing is divided into two parts; the upper section, commonly referred to as the water jacket, being designated at 11a and the bottom portion being designated at 11b is separated from the upper section by the horizontal plate 12. The water jacket is in fact a water tight compartment wherein water is stored and heated by an electrical immersion heating unit designated by numeral 15. This heating unit is a conventional electrical immersion heating unit and the size or heating capacity thereof may be altered depending upon the quantity of water to be heated or time interval alloted for heating a new draw of water. The heating unit is operable on a 220 volt circuit and is connected to the house electrical system through the circuit wires 16—16.

The coffee making portion of the urn comprises the two crocks or coffee jars 20—20 which are disposed in the water jacket so that the major portion thereof will be immersed in the heated water in the jacket. At their upper ends the crocks are formed with encircling, outwardly projecting flanges 21 adapted to rest on the top portion or shelf 13 which forms the closure or upper end wall of the water jacket. Each crock is formed with an outlet 25 centered in the bottom thereof and a removable cover 26 is provided to cover or enclose the crock.

In Fig. 4, I have illustrated a sack lifter 30 applied to one of the crocks and an urn bag or sack 32 is disposed within the sack lifter. The sack lifter serves the purpose of elevating the coffee containing sack well above the liquid in the crock so as to permit a greater amount of coffee to be made in each cock. The sack lifter is of cylindrical form and its lower end rests upon the annular flange 21 in the upper end of the crock and is formed in its upper end with an inwardly and downwardly sloping flange 33 upon which the sack may rest and a predetermined amount of coffee grounds 35 are placed in the sack in preparation for making the coffee. The sack to receive the ground coffee comprises a cloth or web portion 37 through which the boiling water will pass in the coffee making operation. As is shown in Fig. 4, the cover for the crock in which coffee is to be made is removed during the coffee making operation.

Water is fed into the jacket from the house water system through the pipe 40 and I provide a self-closing valve 41 at the exterior of the coffee urn which controls the flow of water into the jacket. The water flowing through the valve passes through the tube 42 which projects into the water jacket then extends upwardly to the upper portion thereof. The end portion 42a of the tube is downwardly bent so that the incoming water will be mixed with the water in the jacket and splashing prevented.

The water drawn into the jacket is heated to the desired degree by the immersion heating unit 15 and when it is desired to make a batch of coffee, the water, heated to substantially boiling temperature, is drawn from the jacket by a pumping unit 50 and is conveyed through the tubing 51 to the swing spray arm 52 mounted on the closure plate 13. The swing spray arm extends to a height substantially above the crock and above the level of the sack lifter disposed in the crock. The swing spray arm comprises a spray head 53 in which downwardly opening holes 55—55 are formed.

Heretofore, I have described parts, with the exception of the pump, which are presently used and which are the main elements of a commercial coffee urn. It is the pump, the manner in which it is mounted, its position relative to the water jacket and the relative sizes of the passages which comprise the basis of my invention.

Figures 5, 6:
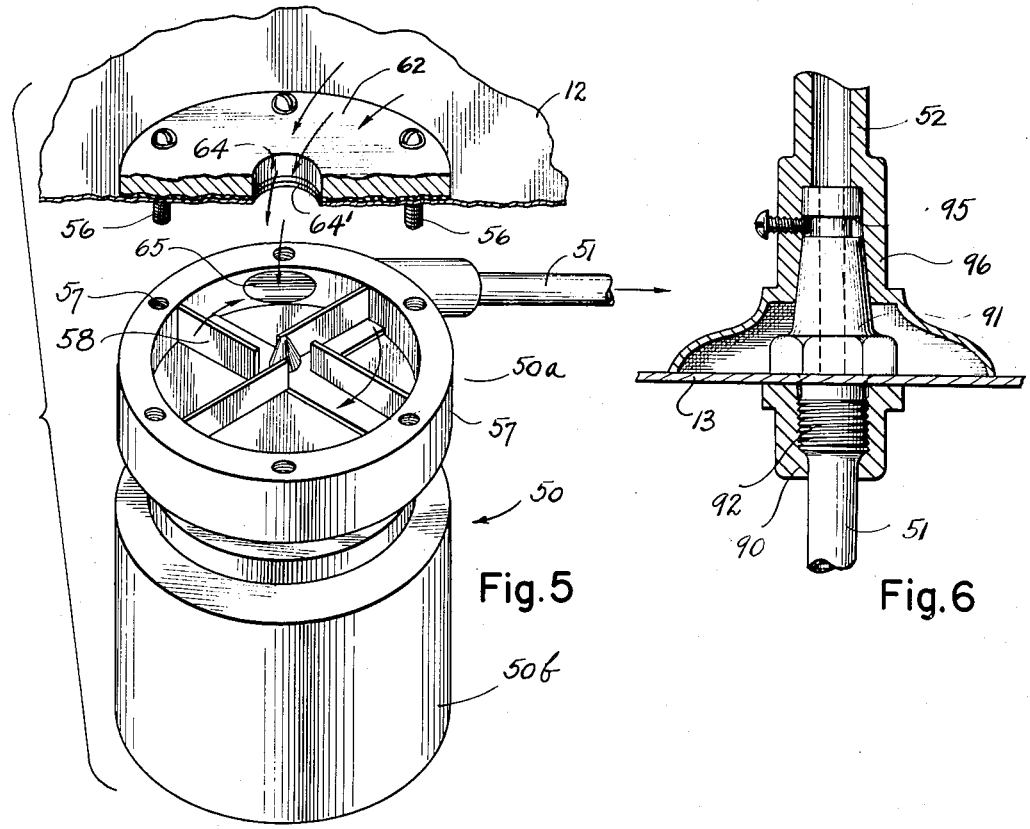
Fig. 5 is an enlarged detail of the motor and pump which embodies the essence of my invention.
Fig. 6 is an enlarged sectional detail of the swing spout mounting.

The pumping unit 50 is relatively small in size and comprises a centrifugal pump 50a and an electric motor 50b for driving the pump. I have found that a one-thirtieth horse power motor is satisfactory to operate the pump. The pumping unit is mounted on the under side of the partitioning plate 12 and is secured to the plate by means of bolts 56. These bolts extend downwardly through a plate 62 which is disposed within the water jacket against the top side of the plate 12 and are threaded into holes 57 in the upper end of the pump housing as shown in Fig. 5. By reference to Fig. 4, it can be seen that the pump 50a is mounted with its axis vertically disposed, and with the electric motor 50b is suspended from the lower end of the pump. The pump rotor 58 is mounted on and driven directly by the motor shaft. The boiling water from the jacket enters the pump through a central opening 64 in the plate 62 registered with an opening 64' in plate 12, and the water is forced from the pump, under relatively low pressure, through an outlet opening 65 in the rotor housing and through the tubing 51 to the swing spout 52.

Figure 2:
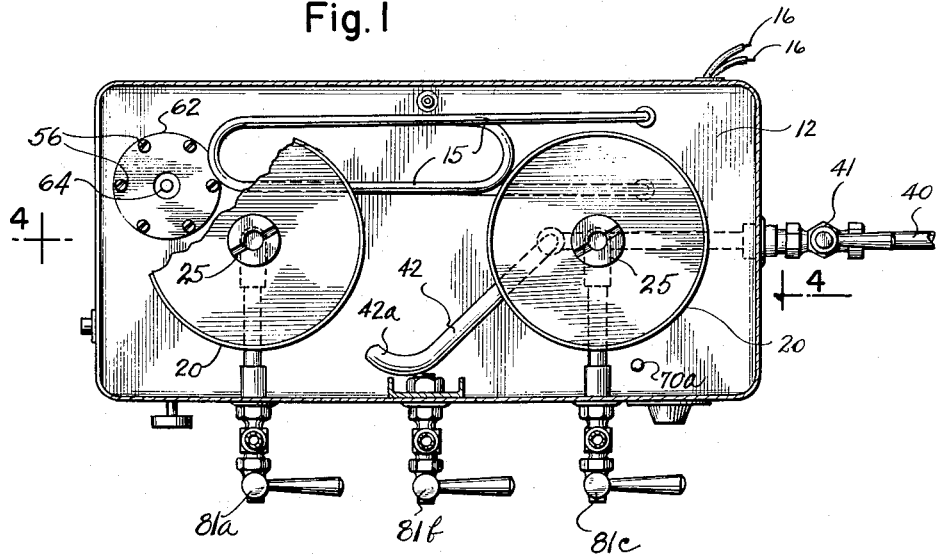
Fig. 2 is a cross-section of the urn taken on the line 2—2 in Fig. 1.
Figure 3:
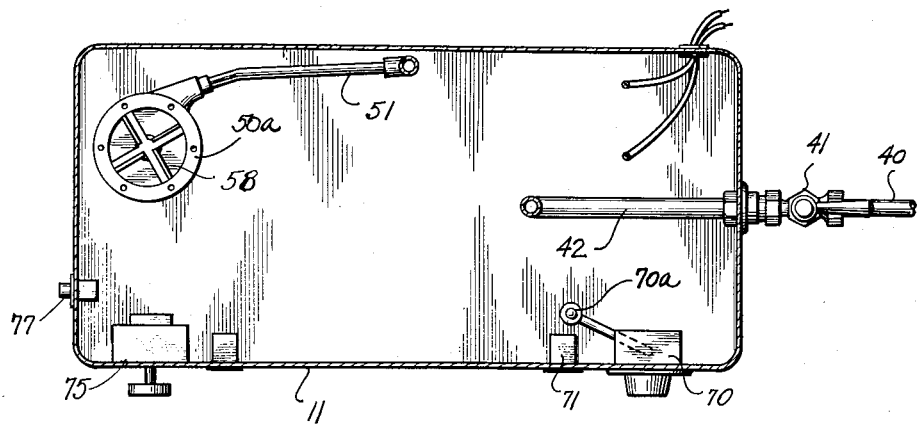
Fig. 3 is a cross-section of the urn, taken on line 3—3 in Fig. 1.

It has been found by numerous experiments and developments that by mounting the pump in the manner illustrated in Fig. 2 it is possible to pump a specific and exact amount of boiling water in a specific time interval. This is of extreme importance in proper or preferred coffee making. Mounting the pump at the under side of the container with the head exposed provides water pressure directly on the propelling rotor 58, so that a constant amount of boiling water will enter the pump and be pumped during the time pumping cycle. The diameter of the opening 65 in the plate 62 controls the consistency of the flow of water and water pressure on the pump head.

The problem of pumping a specific amount of boiling water in a specific time interval arises from the fact that the water when heated to boiling temperature contains a substantial amount of air or air pockets, and when whipped by a pump, cavitation results. Therefore, the specific quantity of water will vary if a pump is employed in a conventional manner or if the water entering the pump is not substantially controlled. I have found that by mounting the pump in this specific manner, below the level of the coils 15, the water entering the pump is not converted into a cavitated condition and I am able to maintain the desired water pressure on the head of the pump. Also, the boiling water is substantially free of air. I have also found that by altering the diameter of the opening 65 in the plate 62 it will affect the quantity of water which will be pumped in the timed pumping cycle. It is, therefore, necessary that this hole or opening be of specific size in relationship to the capacity of the pump. From my experiments, I have found that most satisfactory results are obtained when the opening 65 is approximately one inch in diameter.

To operate the urn and to make coffee, water is drawn into the jacket from the house line 40 and through the self closing valve 41. The water is heated in the jacket to a boiling temperature by means of the heating element 15. The heating and temperature of water is controlled through the thermostatic element 70 which is actuated by the capillary tube 70a. A signal light 71 indicates when the heating unit is in operation. As in conventional thermostat controls, the thermostat may be altered as desired or required and set to operate at any given temperature but for top quality coffee, the water must be boiling. After the water has been heated to boiling temperature, the water may be drawn from the water jacket through the pump and tubing connections and caused to be sprayed into the crock or jar. To make coffee from the boiling water, the pump activating and timing device 75 is moved to "on" position. This will cause the pump to function for the predetermined time cycle. In a three gallon coffee making operation, it has been found that the best results are obtained by causing the pump to operate for a time cycle of five minutes. I provide the signal light 76 to indicate that the pump is in operation, and also for cases of an emergency, I have provided an emergency switch 77 whereby the operation of the pump may be halted immediately. When it is desired to make coffee, the pump activating and timing mechanism is manually adjusted to "on" or "start" position so as to begin the timed pumping cycle. The water is mechanically pumped through the tubing 51 to the spray arm 52 which has been positioned above the urn sack wherein ground coffee has been placed. The boiling water is discharged through the spray head 53 on the end of the swing arm and filters through the coffee grounds into the crock.

In Fig. 1, I have illustrated a plurality of gauge glasses and faucets or valves which are mounted vertically on the front of the urn housing. These gauge glasses are designated by 80a, 80b and 80c respectively, and the valves are designated 81a, 81b and 81c respectively. The gauge glasses 80a and 80c indicate the amount of coffee in each coffee crock and the gauge glass 80b indicates the amount of water in the water jacket. The faucets or valves 81a and 81c afford means whereby coffee can be drawn from the crocks and the valve 81b provides means for drawing water from the water jacket. The gauge glasses and the valves are conventional equipment on a coffee urn.

Figure 7:
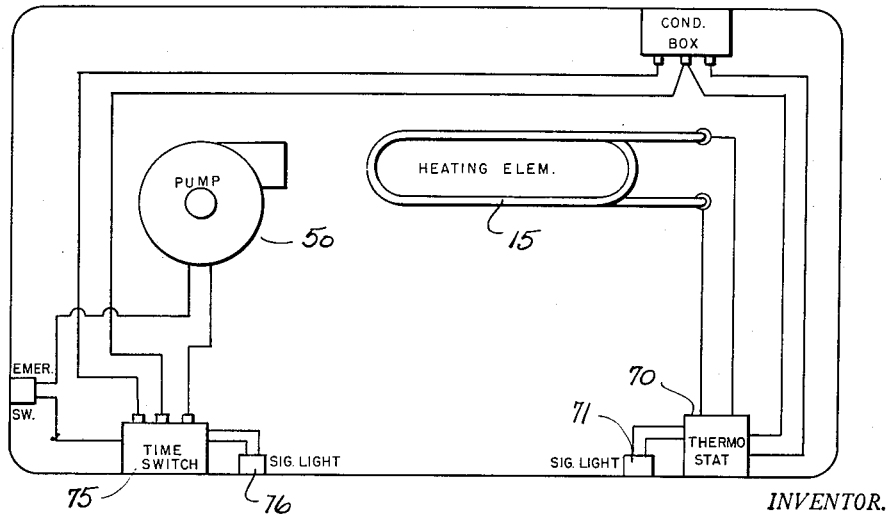
Fig. 7 is a wiring diagram illustrating the electrical connections for control of the heating unit and the pumping mechanism.

In Fig. 7, I have shown a wiring diagram for a coffee urn which embodies the new and novel features of my invention. As has been previously stated, the heating element operates on 220 volts, whereas the pump and timing mechanism are operable on 110 volts.

In Fig. 6, I have illustrated in enlarged detail, the specific construction of the means which I am employing for mounting the swing arm 52 on the cover 13. The upper end of tube 51 is flared and a nut 99 is fixed to the tube. A fitting 91 is threaded at its lower end as at 92 and projects downwardly through the cover 13 and the nut 90 is threaded thereonto to connect pipe 51 with the fitting.

At the upper end of the fitting 91, I provide an encircling groove 95. A housing or cover member 96 is applied over the fitting 91 and a screw 96 is threaded through the cover member and is seated at its end in the groove 95 of the fitting. This screw maintains the cover member in a fixed position on the plate 13 and the swing arm 52 extends from and is adjoined to the fitting 91. This construction provides a water tight joint between the swing arm and the fitting and yet permits the arm to be rotated to position for discharge of water into either of the crocks. This is my preferred construction, but my invention is not to be construed as residing in the specific details of piping connections or the manner in which the swing spray arm is mounted.

Having thus described my invention, what I claim as new therein, and desire to secure by Letters Patent, is:

In a coffee making device having a jacket providing a water storage and heating compartment and a second compartment directly below the heating compartment and separated therefrom by a horizontal plate defining the bottom of said water storage and heating compartment, a coffee making receptacle disposed within said water storage compartment, means in said water storage compartment for heating the contents thereof, a pump mounted in said second compartment in vertical depending relation to said horizontal plate, means for driving said pump, said pump including an impeller housing having an open top secured directly to the under surface of said horizontal plate so that the plate constitutes a cover for the impeller housing, an impeller disposed within said impeller housing and mounted for rotation about an axis perpendicular to said plate, said plate having an opening therein in register with the axis of said impeller so that water is fed into the pump directly from the water storage compartment through the plate opening, said impeller housing having a tangential discharge conduit extending therefrom and terminating in a spray head disposed above said coffee making receptacle for discharging water from the storage compartment thereinto.

References Cited in the file of this patent

UNITED STATES PATENTS

| | | |
|---|---|---|
| 941,009 | Cauchois | Nov. 23, 1909 |
| 1,226,005 | Rathman | May 15, 1917 |
| 1,719,713 | Miller | July 2, 1929 |
| 1,805,159 | Bauer et al. | May 12, 1931 |
| 2,360,194 | Bright | Oct. 10, 1944 |
| 2,507,255 | Kaufman | May 9, 1950 |
| 2,552,169 | Graham | May 8, 1951 |
| 2,561,631 | Negri | July 24, 1951 |